(12) United States Patent
Deneroff

(10) Patent No.: US 10,853,251 B2
(45) Date of Patent: Dec. 1, 2020

(54) DIADIC MEMORY OPERATIONS AND EXPANDED MEMORY FRONTEND OPERATIONS

(71) Applicant: Lucata Corporation, New York, NY (US)

(72) Inventor: Martin M. Deneroff, New York, NY (US)

(73) Assignee: Lucata Corporation, New York, NY (US)

( * ) Notice: Subject to any disclaimer, the term of this patent is extended or adjusted under 35 U.S.C. 154(b) by 0 days.

(21) Appl. No.: 16/546,713

(22) Filed: Aug. 21, 2019

(65) Prior Publication Data

US 2019/0377678 A1    Dec. 12, 2019

Related U.S. Application Data

(62) Division of application No. 15/890,580, filed on Feb. 7, 2018, now Pat. No. 10,628,310.

(60) Provisional application No. 62/455,688, filed on Feb. 7, 2017.

(51) Int. Cl.
*G06F 15/00* (2006.01)
*G06F 12/0806* (2016.01)
*G06F 13/16* (2006.01)

(52) U.S. Cl.
CPC .......... *G06F 12/0806* (2013.01); *G06F 13/16* (2013.01)

(58) Field of Classification Search
None
See application file for complete search history.

(56) References Cited

U.S. PATENT DOCUMENTS

| | | | | |
|---|---|---|---|---|
| 6,915,457 B1* | 7/2005 | Miller | ................. | G06F 11/3495 370/244 |
| 2002/0178405 A1* | 11/2002 | McCullough | ....... | G06F 11/3656 714/45 |
| 2008/0162894 A1* | 7/2008 | Luick | .................... | G06F 9/3889 712/220 |
| 2015/0154144 A1* | 6/2015 | Kim | .................... | G06F 9/30036 712/30 |

\* cited by examiner

*Primary Examiner* — Corey S Faherty
(74) *Attorney, Agent, or Firm* — Gesmer Updegrove LLP

(57) ABSTRACT

A method of performing diadic operations in a processor is provided that includes receiving a first request packet initiating a read operation from a first memory address in the first request packet, and executing a first operation in the first request packet once the read request is completed. Also, the method includes generating a second request packet at a second memory address by combining the results of the first operation with the unused information in the first request packet. Furthermore, the method includes sending the second request packet to the Memory-Side Processor (MSP). When the MSP receives the second request, the MSP checks to determine if a write operation is requested and writes data to the second memory address, if a read operation is requested, the MSP reads data from the second memory address.

1 Claim, 2 Drawing Sheets

DIADIC MEMORY OPERATIONS AND EXPANDED MEMORY FRONTEND OPERATIONS

PRIORITY INFORMATION

The present application is a U.S. divisional application of U.S. patent application Ser. No. 15/890,580 filed Feb. 7, 2018, which claims priority to U.S. provisional application No. 62/455,688 filed Feb. 7, 2017, which is incorporated herein by reference in its entirety.

BACKGROUND OF THE INVENTION

The invention is related to the field of memory processors, and in particular diadic memory operations and expanded Memory Frontend (MFE) operations.

In recent years, a corollary of Moore's law that predicts processors will double in performance every couple of years has ended. Microprocessor manufacturers have encountered a clock frequency wall as energy consumption has limited the clock frequency scaling that was the norm for three decades. In 2004, Intel initially delayed, then cancelled its flagship 4 GHz chip. However, Dr. Gordon Moore's original observation of doubling transistor count every 18 to 24 months is still holding true, and chip manufacturers are turning the excess transistors into multiple cores per chip. Intel's commodity microprocessors currently have up to 8 cores, and within the next two years 12-core processors are expected. In laboratory tests, Intel has already demonstrated 80 cores on a single silicon chip.

While clock rates have ceased, or nearly ceased, improving, it has become necessary to utilize architectural improvements in both hardware and software to allow continued performance gains in the face of constant clock rates. In particular, making more efficient use of memory and interconnect bandwidth holds great promise for delivering greatly improved performance levels without a need to grow clock rates.

SUMMARY OF THE INVENTION

According to one aspect of the invention, there is provided a method of performing diadic operations in a processor. The method includes receiving a first request packet initiating a read operation from a first memory address in the first request packet, and executing a first operation in the first request packet once the read request is completed. Also, the method includes generating a second request packet at a second memory address by combining the results of the first operation with the unused information in the first request packet. Furthermore, the method includes sending the second request packet to a memory-Side Processor (MSP). When the MSP receives the second request, the MSP checks to determine if a write operation is requested and writes data to the second memory address, if a read operation is requested, the MSP reads data from the second memory address.

According to another aspect of the invention, there is provided a memory-side processor (MSP). The MSP includes a front-end decoder that interprets incoming requests packets, checks for address conflicts and holds off requests until such conflicts are resolved, and initiates read or write operations. A delay queue delivers incoming requests packets to the diadic processing unit at the same time as the memory controller delivers corresponding read data. A memory controller performs reads and writes to memory under command of the front-end decoder and the diadic processing unit. A diadic processing unit performs a two-operand operation on the read data for which further diadic processing can be performed.

DETAILED DESCRIPTION OF THE INVENTION

The invention describes a system and method for performing diadic memory operations and expanded memory frontend operations. The invention reduces the amount of logic in the CPU by moving operations into the Memory-Side Processor (MSP). Since there are four times as many CPUs as MSPs, this results in a 75% reduction in the logic dedicated to the functions so moved. Also, the invention improves performance and reduces the size of compiled code. Operations performed in the MSP are generally more flexible, in that they are capable of placing a result in memory or back in the CPU. Since many of these operations can be performed concurrently, the available parallelism is greatly increased.

Moreover, the invention creates a new instruction model, the Diadic Memory Operation. These instructions take two addresses and potentially one or more data words as inputs, and store a result in the memory location pointed to by the second address, using the contents of the first memory location as one operand. Thus they potentially have up to three operands (the contents of up to two memory locations and/or the operands supplied in the transmitted request packet). They can perform up to two arithmetic/logical operations (one at each memory location). They thus use far less network bandwidth than consumed by letting the executing thread access the two memory locations in succession.

Figure 1:
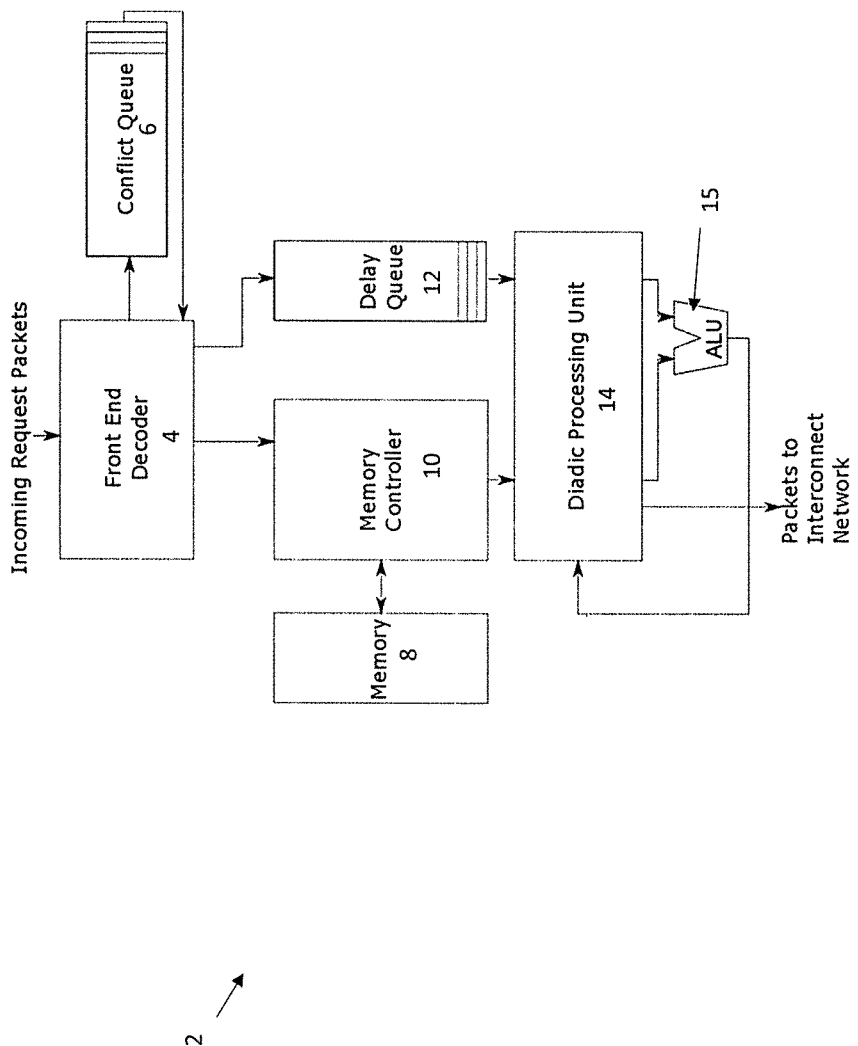
FIG. 1 is a schematic diagram illustrating the operation of the Memory-Side Processor (MSP) used in accordance with the invention.

FIG. 1 shows the architecture used in accordance with the invention that employs a Memory-Side Processor (MSP) 2 to perform a variety of special operations that require performing read-modify-write sequences in response to a single request. The MSP performs a diadic operations that is defined as an operation involving a transaction performed on two different memory locations that is initiated by a single instruction. The method includes receiving a first request packet sent to the memory system 8 by a CPU and a Memory-Side Processor (MSP) initiating a sequence of operations based on the contents of the request packet. The MSP decodes the incoming packet to determine the type of operation requested. If the request is an ordinary READ or WRITE operation, the MSP performs the operation as is common in most memory controllers.

If the operation is not a READ or a WRITE, it is one of a class of operations that is termed a DIADIC. The MSP 2 includes a Front End Decoder (FED) 4 that performs checks to see if other memory operations are in progress to the same address. This is known as an Address Conflict. If an address conflict exists, it queues the incoming operation in the Conflict Queue 6 until all conflicting operations have been completed. Other incoming operations that have no address conflicts are allowed to execute ahead of the operations in the Conflict Queue 6. A FED 4 now performs a read operation from a first memory address in the first request packet, and places the entire request packet in the Delay Queue (DQ) 12, which delivers the packet to the Diadic Processing Unit (DPU) 14 at the same time as the data from a memory 8 is delivered by a Memory Controller 10.

The DPU 14 now executes an arithmetic or logical operation on one or two operands, the first of which is the data from memory 8, and the second of which (if used) is taken from the request packet coming from the DQ 12. This request packet also specifies the particular arithmetic or logical operation to be performed using an arithmetic logic unit (ALU) 15. Upon completing the arithmetic or logical operation, the DPU 14 now creates a second request packet, containing the result of the operation, and the following information from the original request packet: a second address, potentially a second operand, a second function code, and a field identifying the source of the original request. This new request packet is sent through the interconnect network to the MSP 2 that is connected to the memory bank containing the second memory address. The MSP 2 that receives the second packet performs using the technique described as above, then creates an Acknowledge packet back to the source of the original request, thus completing the operation.

Figure 2:
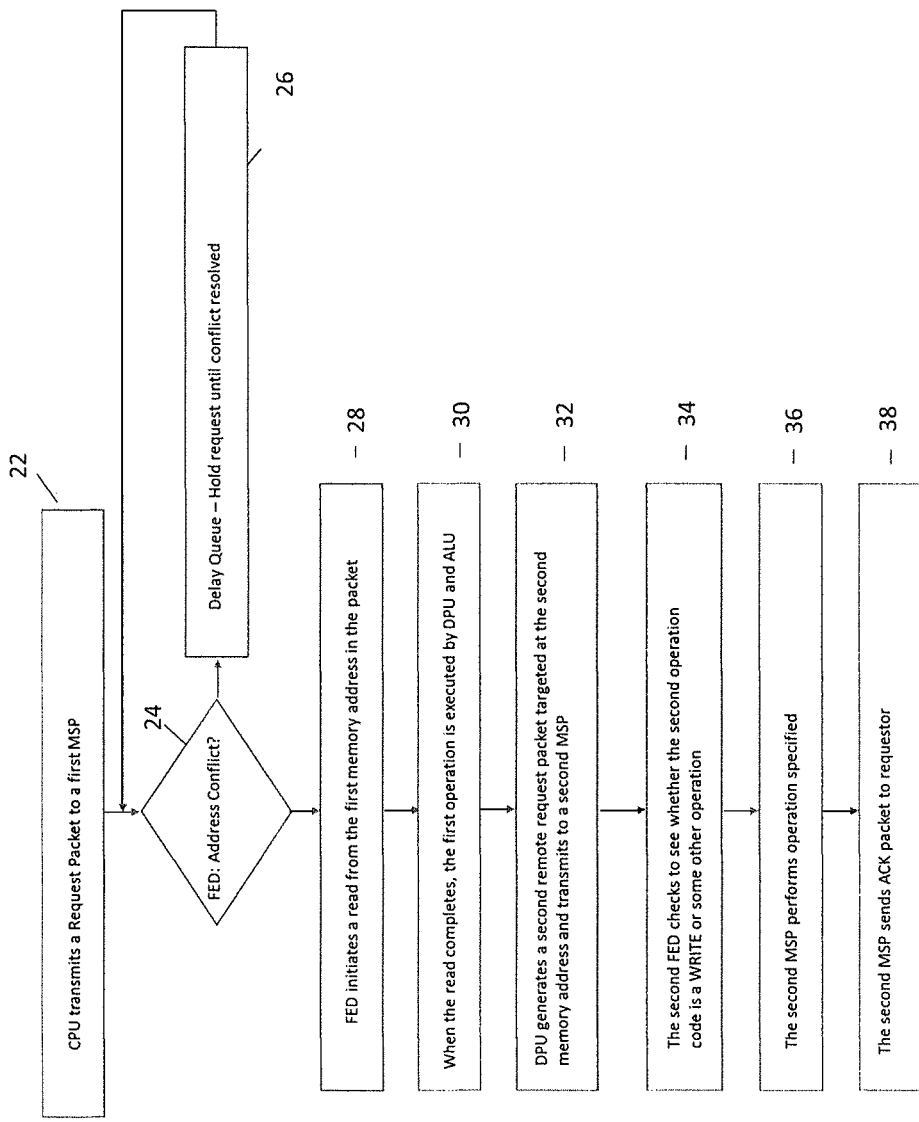
FIG. 2 is a flow graph illustrating the steps in performing a diadic operation in accordance with the invention.

FIG. 2 is flowchart 20 illustrating the details of how diadic instructions operate in a processing system. In all cases, the actual arithmetic/logical calculation(s) for diadic operations occurs in the MSP. The CPU supplies at most two addresses and two words of data, plus two command fields and potentially a few additional bits of control information and a source ID identifying the CPU and program thread that initiated the operation, as step 22. This information is sent to the MSP containing the first address. The Front End Decoder (FED) determines if there are any conflicts, as shown in step 24. If there is a conflict, the FED sends the request to the delay queue, as shown in step 26, which the process is restarted. Otherwise the FED initiates a READ from the first memory address in the request packet, as shown in step 28. When the READ is completed, the first operation is executed by the DPU and ALU, as shown in step 30. The DPU generates a second remote request that targets at a second memory address and transmits the second remote request to a second MSP, as shown in step 32.

When this second request is received at the second MSP, its FED checks to see whether the second operation code is a WRITE or some other operation, as shown in step 34. The second FED writes the data it received at the specified location and transmits an ACK message back to the originating thread. The subsequent steps shown are not performed in this case. If the second operation is READ, the incoming packet contains two addresses, the first of which is actually the address to be read (This operation is an indirect using the contents of the first memory location as the indirect pointer.) A read is initiated at this address. When the data returns, it is combined with the second address and source ID from the queue and used to generate another Remote Write message to a third memory location. The MSP targeted by that operation will perform the write and send an ACK back to the requesting thread. Note if the second operation is not WRITE or READ, it initiates a read of the second memory address and enqueues the remaining information in the request for use when the read completes.

When the read completes, the second MSP performs the second operation (specified in the command field)—depending on the command, this operation may or may not involve a data word from the incoming request, as shown in step 36. The result of this operation is written back to the specified memory address, and an ACK message is transmitted back to the originating thread as shown in step 38.

The invention aids in increasing processing efficiency by having a MSP handling much of the processing done currently by the central processing unit of a computer system. Moreover, the invention can be leveraged to initiate actions and intelligent decision using diadic operations described herein. Using the invention, one can devise better control of traffic to various processing units leveraging the MSP.

Although the present invention has been shown and described with respect to several preferred embodiments thereof, various changes, omissions and additions to the form and detail thereof, may be made therein, without departing from the spirit and scope of the invention.

What is claimed is:

1. A memory-side processor comprising:
a diadic processing unit;
a front-end decoder that interprets incoming requests packets, checks for address conflicts and holds off requests until such conflicts are resolved, and initiates read or write operations;
a delay queue that delivers incoming requests packets to the diadic processing unit at the same time as the memory controller delivers corresponding read data; and
a memory controller that performs read and write operations to memory under command of the front-end decoder and the diadic processing unit; wherein
said diadic processing unit performs a two-operand operation on the read data for which further diadic processing can be performed.

* * * * *